(12) United States Patent
Tomioka

(10) Patent No.: US 10,190,676 B2
(45) Date of Patent: Jan. 29, 2019

(54) WORKING VEHICLE

(71) Applicant: ISEKI & CO., LTD., Ehime-Ken (JP)

(72) Inventor: Eiji Tomioka, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 268 days.

(21) Appl. No.: 15/184,410

(22) Filed: Jun. 16, 2016

(65) Prior Publication Data

US 2016/0377173 A1 Dec. 29, 2016

(30) Foreign Application Priority Data

Jun. 29, 2015 (JP) .................. 2015-129734

(51) Int. Cl.
| | | |
|---|---|---|
| *F16H 59/02* | (2006.01) | |
| *G05G 1/44* | (2008.04) | |
| *G05G 5/05* | (2006.01) | |
| *B62D 49/06* | (2006.01) | |
| *F16H 59/06* | (2006.01) | |

(52) U.S. Cl.
CPC ......... *F16H 59/0208* (2013.01); *F16H 59/02* (2013.01); *G05G 1/44* (2013.01); *G05G 5/05* (2013.01); *B62D 49/0692* (2013.01); *F16H 2059/0234* (2013.01); *F16H 2059/0295* (2013.01); *F16H 2059/065* (2013.01)

(58) Field of Classification Search
CPC ......... F16H 59/0208; F16H 2059/0234; F16H 2059/0295
See application file for complete search history.

(56) References Cited

U.S. PATENT DOCUMENTS

| | | | | |
|---|---|---|---|---|
| 6,250,414 | B1 * | 6/2001 | Sato | ....................... B60K 17/08 180/307 |
| 7,337,870 | B2 * | 3/2008 | Izukura | ................... F16H 59/06 180/307 |
| 9,174,613 | B2 * | 11/2015 | Masumoto | ................ B60T 7/06 |
| 2016/0010745 | A1 * | 1/2016 | Reep | ....................... F16H 59/06 74/512 |
| 2016/0025216 | A1 * | 1/2016 | Nishino | ................ F16H 61/439 60/437 |

FOREIGN PATENT DOCUMENTS

JP   2005-233260 A   9/2005

* cited by examiner

*Primary Examiner* — Thomas E Lazo
(74) *Attorney, Agent, or Firm* — Bacon & Thomas, PLLC

(57) ABSTRACT

A working vehicle, including: an HST pedal which operates an HST; a damper arm which interlocks with an HST pedal rotation-shaft of the HST pedal; a damper attached to the damper arm; and a transmission case, wherein the transmission case has a first transmission case swelling part swelling to at least one side with respect to a left-and-right direction, and the damper is arranged behind the first transmission case swelling part.

7 Claims, 13 Drawing Sheets

WORKING VEHICLE

BACKGROUND OF THE INVENTION

The present invention relates to a working vehicle such as a tractor or the like.

Known is a working vehicle, comprising: an HST (Hydro Static Transmission) pedal which operates an HST; and a damper arm which interlocks with an HST pedal rotation-shaft of the HST pedal (for example, refer to Japanese Patent Application Publication No. 2005-233260).

A damper like this is attached in consideration of a starting/stopping pedal operation feeling suited to the preference of a worker.

SUMMARY OF THE INVENTION

However, in the aforedescribed conventional working vehicle, damage of the damper sometimes occurs.

And, the present inventor has noticed that damage of the damper like this is often due to accumulation of mud and the like.

The present invention furnishes, in consideration of the aforedescribed conventional problem, a working vehicle for which damage of the damper is able to be made less prone to occur.

The $1^{st}$ aspect of the present invention is a working vehicle, comprising:
an HST pedal which operates an HST;
a damper arm which interlocks with an HST pedal rotation-shaft of the HST pedal;
a damper attached to the damper arm; and
a transmission case, wherein
the transmission case has a first transmission case swelling part swelling to at least one side with respect to a left-and-right direction, and
the damper is arranged behind the first transmission case swelling part.

By means of this, since the damper is arranged behind the first transmission case swelling part, the influence of mud becomes small, and damage of the damper due to accumulation of mud and the like can be made less prone to occur.

The $2^{nd}$ aspect of the present invention is the working vehicle according to the $1^{st}$ aspect of the present invention, wherein a longitudinal direction of the damper is an up-and-down direction.

By means of this, since the whole of the damper is arranged in close proximity to the first transmission case swelling part, damage of the damper due to accumulation of mud and the like can be made still less prone to occur.

The $3^{rd}$ aspect of the present invention is the working vehicle according to the $2^{nd}$ aspect of the present invention, comprising a gear pump arranged behind the damper.

By means of this, by the gear pump arranged behind the damper, the influence of mud from behind with regards to the damper becomes smaller, and damage of the damper due to accumulation of mud and the like can be made still less prone to occur.

The $4^{th}$ aspect of the present invention is the working vehicle according to the $1^{st}$ aspect of the present invention, comprising:
an HST neutrality-returning cam which interlocks with the HST pedal rotation-shaft;
an HST neutrality-returning arm which abuts the HST neutrality-returning cam; and
an HST neutrality-returning spring which energizes the HST neutrality-returning arm, so that the HST pedal rotation-shaft returns to a neutrality position, wherein
the transmission case has a second transmission case swelling part swelling to another side with respect to the left-and-right direction, the another side being a side opposite to the one side, and
the HST neutrality-returning cam, the HST neutrality-returning arm, and the HST neutrality-returning spring are arranged behind the second transmission case swelling part.

By means of this, since the HST neutrality-returning cam, the HST neutrality-returning arm, and the HST neutrality-returning spring are arranged behind the second transmission case swelling part, the influence of mud becomes smaller, and damage of the HST neutrality-returning cam, the HST neutrality-returning arm, and the HST neutrality-returning spring due to accumulation of mud and the like can be made less prone to occur.

The $5^{th}$ aspect of the present invention is the working vehicle according to the $2^{nd}$ aspect of the present invention, comprising:
an HST neutrality-returning cam which interlocks with the HST pedal rotation-shaft;
an HST neutrality-returning arm which abuts the HST neutrality-returning cam; and
an HST neutrality-returning spring which energizes the HST neutrality-returning arm, so that the HST pedal rotation-shaft returns to a neutrality position, wherein
the transmission case has a second transmission case swelling part swelling to another side with respect to the left-and-right direction, the another side being a side opposite to the one side, and
the HST neutrality-returning cam, the HST neutrality-returning arm, and the HST neutrality-returning spring are arranged behind the second transmission case swelling part.

By means of this, since the HST neutrality-returning cam, the HST neutrality-returning arm, and the HST neutrality-returning spring are arranged behind the second transmission case swelling part, the influence of mud becomes smaller, and damage of the HST neutrality-returning cam, the HST neutrality-returning arm, and the HST neutrality-returning spring due to accumulation of mud and the like can be made less prone to occur.

The $6^{th}$ aspect of the present invention is the working vehicle according to the $3^{rd}$ aspect of the present invention, comprising:
an HST neutrality-returning cam which interlocks with the HST pedal rotation-shaft;
an HST neutrality-returning arm which abuts the HST neutrality-returning cam; and
an HST neutrality-returning spring which energizes the HST neutrality-returning arm, so that the HST pedal rotation-shaft returns to a neutrality position, wherein
the transmission case has a second transmission case swelling part swelling to another side with respect to the left-and-right direction, the another side being a side opposite to the one side, and
the HST neutrality-returning cam, the HST neutrality-returning arm, and the HST neutrality-returning spring are arranged behind the second transmission case swelling part.

By means of this, since the HST neutrality-returning cam, the HST neutrality-returning arm, and the HST neutrality-returning spring are arranged behind the second transmission case swelling part, the influence of mud becomes smaller, and damage of the HST neutrality-returning cam, the HST neutrality-returning arm, and the HST neutrality-returning spring due to accumulation of mud and the like can be made less prone to occur.

The 7$^{th}$ aspect of the present invention is the working vehicle according to the 1$^{st}$ aspect of the present invention, comprising a damper stay which is attached to a vehicle-body, and supports the damper, wherein in the damper stay, plural holes to which the damper is selectively joined are provided.

By means of this, since in the damper stay, plural holes to which the damper is selectively joined are provided, a starting/stopping pedal operation feeling suited to the preference of a worker can be met.

The 8$^{th}$ aspect of the present invention is the working vehicle according to the 1$^{st}$ aspect of the present invention, wherein in the damper arm, plural holes to which the damper is selectively joined are provided.

By means of this, since in the damper arm, plural holes to which the damper is selectively joined are provided, a starting/stopping pedal operation feeling suited to the preference of a worker can be met.

By the present invention, a working vehicle for which damage of the damper is able to be made less prone to occur can be furnished.

Figure 1:
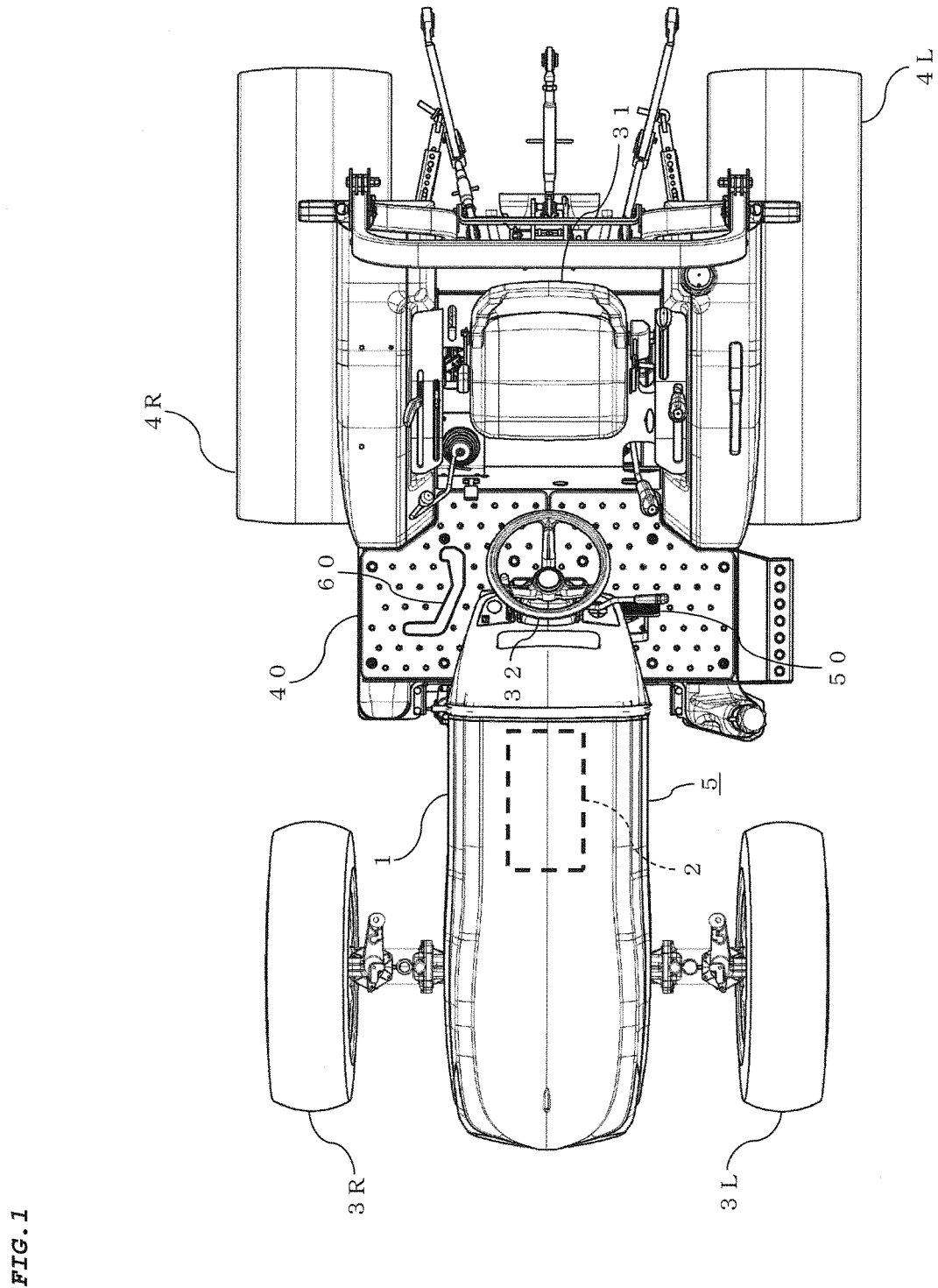
FIG. 1 is a top view of the tractor of the embodiment in the present invention.

DESCRIPTION OF THE REFERENCE NUMERALS 1 bonnet
2 engine
3L, 3R front wheel
4L, 4R rear wheel
5 vehicle-body
6 gear pump
11 HST
12 HST trunnion shaft
12$a$ end part
13 HST trunnion arm
20 transmission case
21L, 21R transmission case swelling part
31 driving seat
32 steering handle
40 step floor
50 brake pedal
60 HST pedal
60$a$, 60$b$ bolt
61 pedal base part
62 pedal stepping-on part
70 HST pedal rod
70$a$, 70$b$ pin
80 HST pedal rotation-shaft
80$a$, 80$b$ end part
90 HST neutrality-returning mechanism
91 HST neutrality-returning cam
92 HST neutrality-returning arm
93 HST neutrality-returning arm rotation-member
93$a$ fulcrum pin
94 HST neutrality-returning spring
95 HST neutrality-returning arm sensor
100 auto-cruise link mechanism
101 arm
102 link plate
103 auto-cruise plate
104 rotation arm-member
105 auto-cruise arm
106 auto-cruise rod
110 damper mechanism
111 damper arm
111$a$ hole
112 damper stay
112$a$ hole
113, 114 damper
115 damper-juxtaposing hub

DETAILED DESCRIPTION OF THE INVENTION

In the following, referring to the drawings, descriptions are given in detail regarding embodiments in the present invention.

In the beginning, referring to FIGS. 1 to 5, descriptions are specifically given regarding the configuration and action of a tractor of the present embodiment which is an example of the working vehicle.

Figure 2:
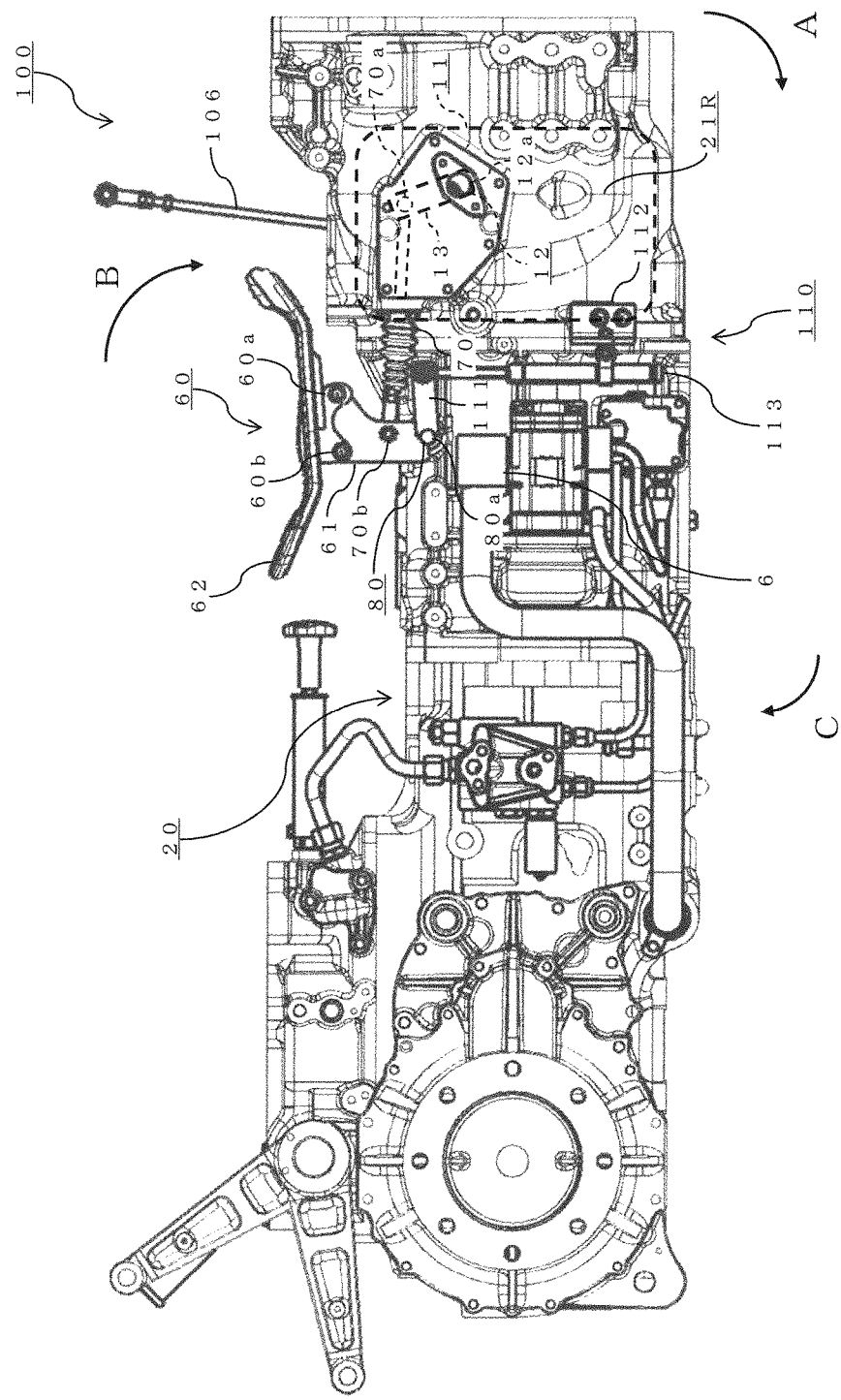
FIG. 2 is a partial right side view of the neighborhood of the transmission case of the tractor of the embodiment in the present invention.
Figure 3:
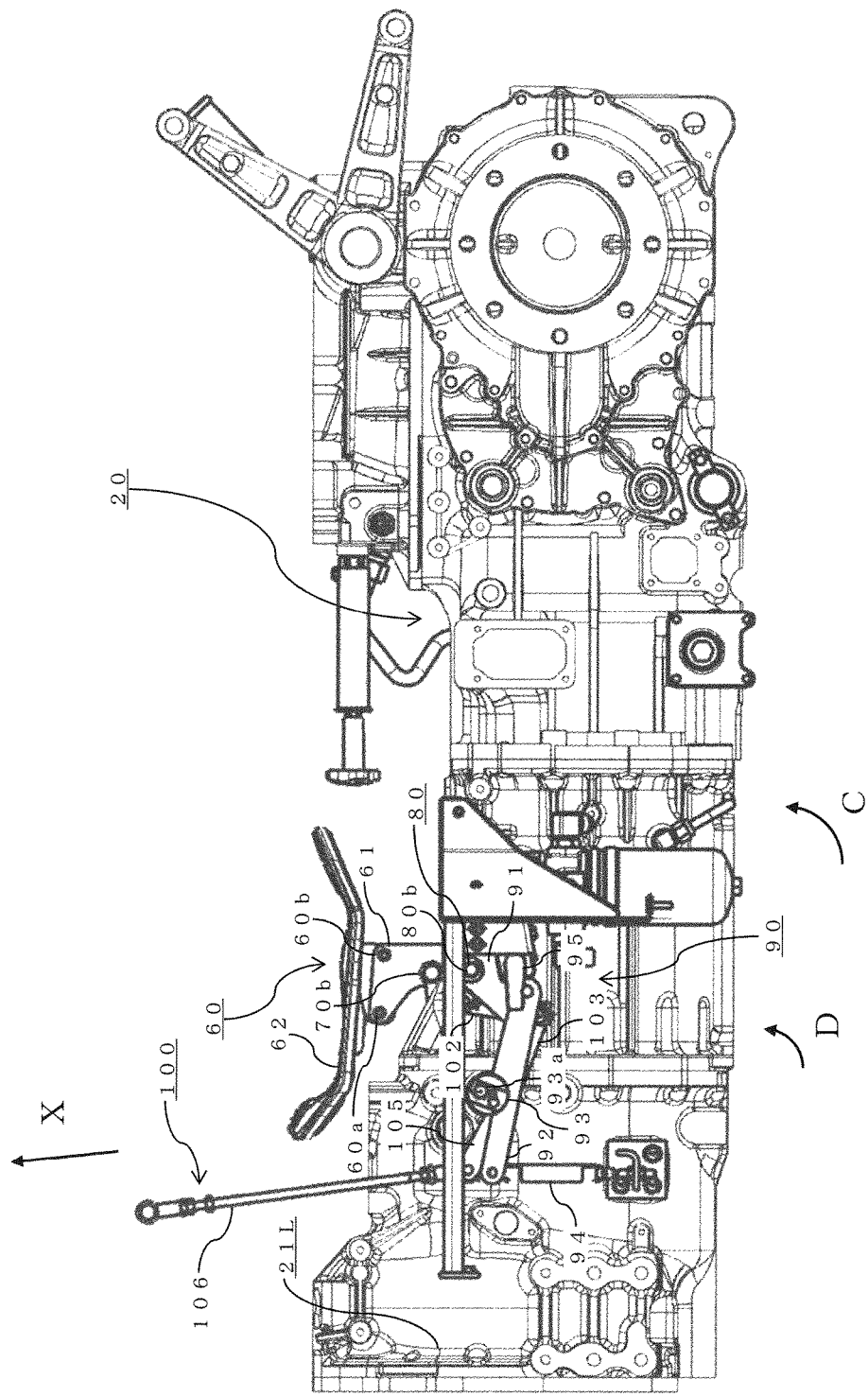
FIG. 3 is a partial left side view of the neighborhood of the transmission case of the tractor of the embodiment in the present invention.
Figure 4:
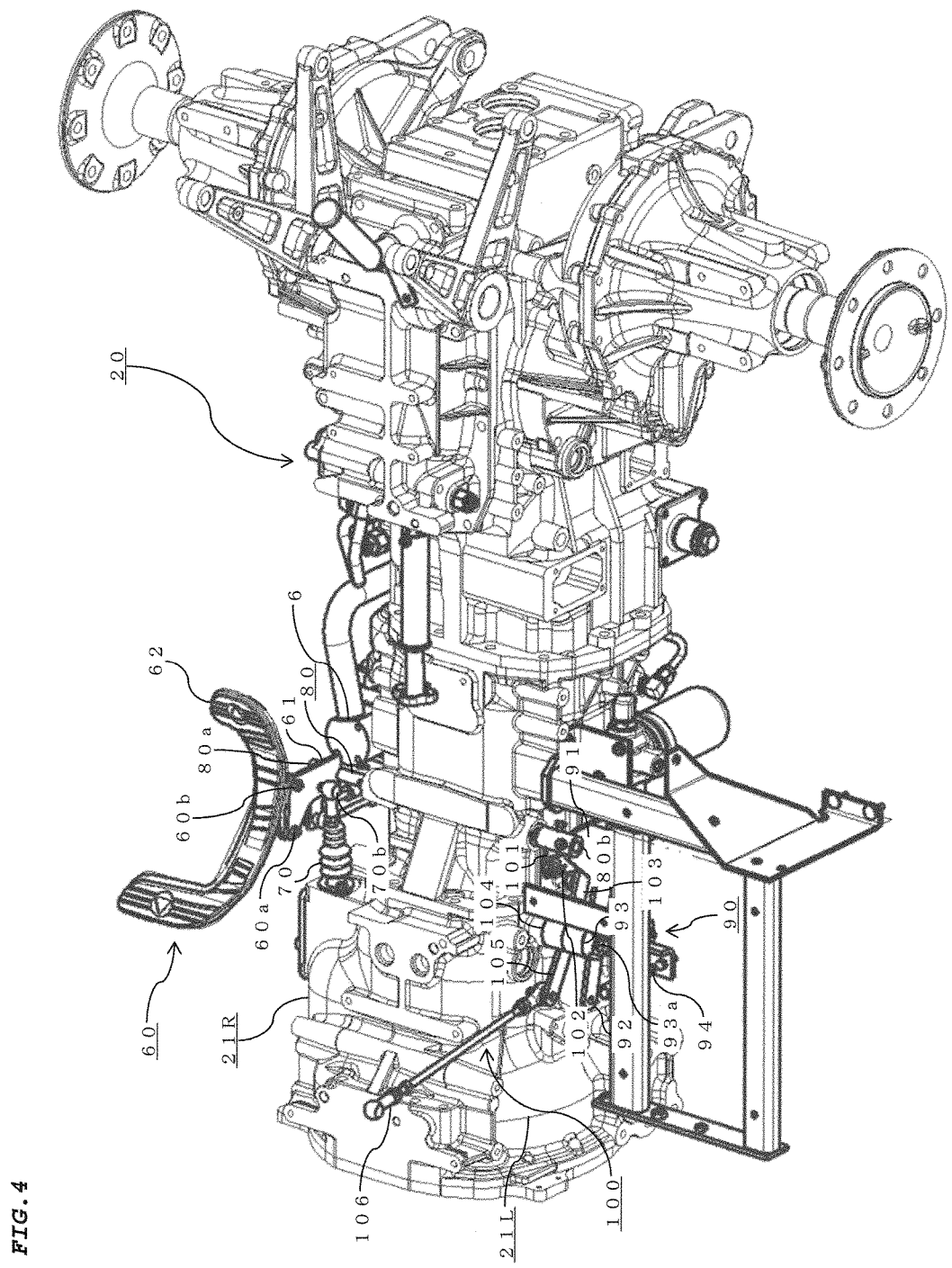
FIG. 4 is a partial perspective view (No. 1) of the neighborhood of the transmission case of the tractor of the embodiment in the present invention.
Figure 5:
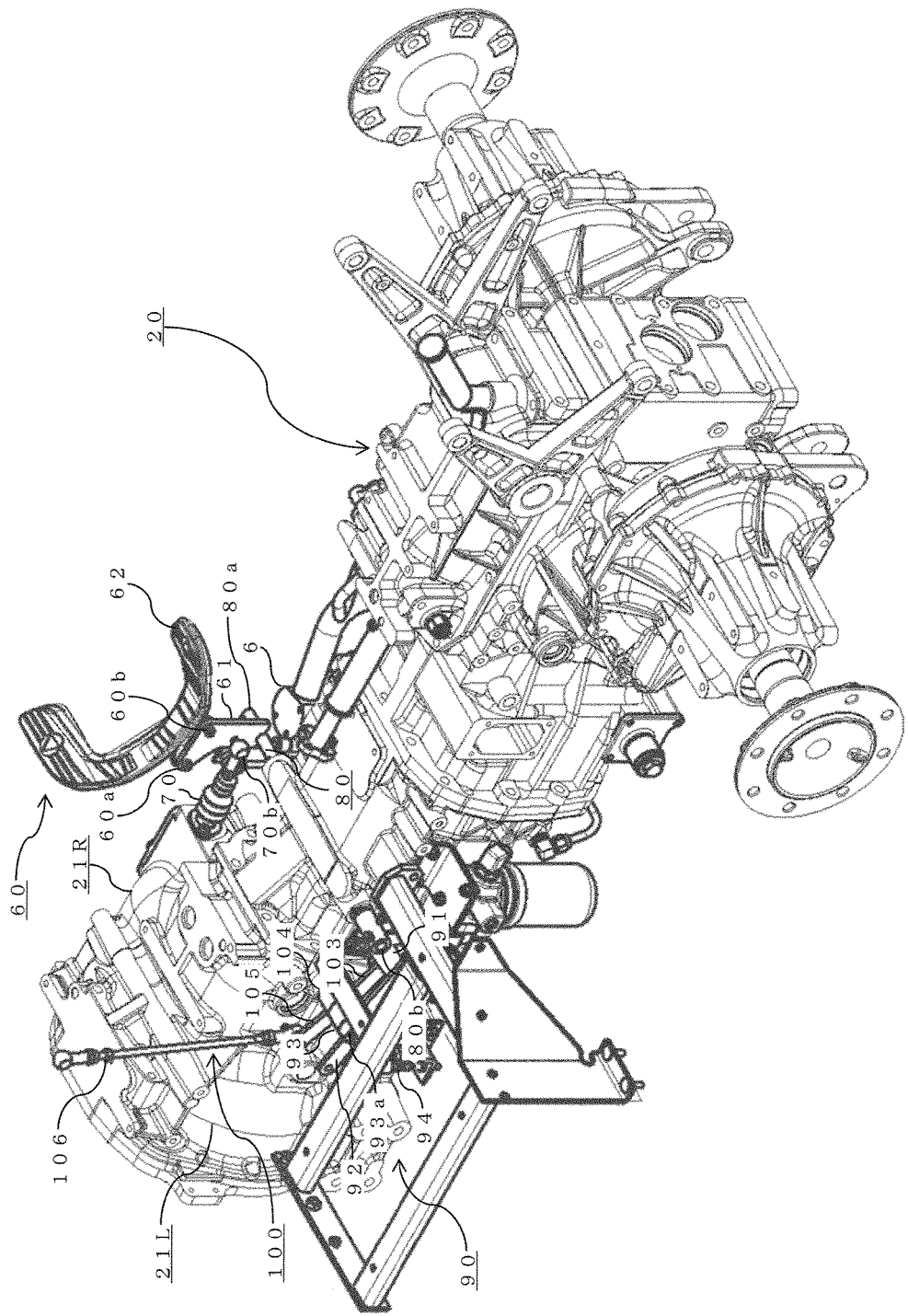
FIG. 5 is a partial perspective view (No. 2) of the neighborhood of the transmission case of the tractor of the embodiment in the present invention.

Here, FIG. 1 is a top view of the tractor of the embodiment in the present invention, FIG. 2 is a partial right side view of the neighborhood of a transmission case 20 of the tractor of the embodiment in the present invention, FIG. 3 is a partial left side view of the neighborhood of the transmission case 20 of the tractor of the embodiment in the present invention, and FIGS. 4 and 5 are partial perspective views (Nos. 1 and 2) of the neighborhood of the transmission case 20 of the tractor of the embodiment in the present invention.

In FIG. 4, the transmission case 20 is viewed from the left upper side and, in FIG. 5, the transmission case 20 is viewed from the left upper rear side.

In FIGS. 2 to 5, for example, a step floor 40 and the like are not shown, so that descriptions in the following will become easier to understand.

In the inner part of a bonnet 1 of the front part of a vehicle-body 5, an engine 2 is provided.

The transmission case 20 is provided below the step floor 40.

The transmission case 20 has a transmission case swelling part 21R swelling to the right side, and a transmission case swelling part 21L swelling to the left side.

Additionally, the transmission case swelling part 21R swelling to the right side is an example of the first transmission case swelling part swelling to at least one side with respect to the left-and-right direction, and the transmission case swelling part 21L swelling to the left side is an example of the second transmission case swelling part swelling to another side with respect to the left-and-right direction, the another side being a side opposite to the one side.

Rotary motive force of the engine 2 is transmitted via an HST 11 to a speed-changing device of the inner part of the transmission case 20. And, the rotary motive force with speed-decreasing having been carried out at the relevant speed-changing device is transmitted to left and right front wheels 3L and 3R, and left and right rear wheels 4L and 4R.

Behind the engine 2, a steering handle 32 for carrying out steerage with the front wheels 3L and 3R is provided.

Behind the steering handle 32, a driving seat 31 is provided.

At the rear part of the vehicle-body 5, a working machine (not shown) such as a rotary tilling device or the like is installed utilizing a mechanism such as a 3-point link mechanism or the like.

A hose cover covers hoses joined to the steering handle 32.

On the step floor 40 at the left side of an operation column cover, a brake pedal 50 for performing braking with the rear wheels 4L and 4R in correspondence to a stepping-on operation of a worker is arranged.

On the step floor 40 at the right side of the operation column cover, an HST pedal 60 is arranged.

The HST pedal 60 is a pedal which operates the HST 11 arranged in the inner part of the transmission case 20.

As will be described in detail later, modulation of the HST trunnion opening-degree of the HST 11 is performed in correspondence to a stepping-on operation of the seesaw-type HST pedal 60, and non-step speed-changing corresponding to frontward movement speed-increasing, neutrality and rearward movement speed-increasing is realized.

Next, mainly referring to FIGS. 1 to 5, descriptions are more specifically given regarding the configuration and action of the tractor of the present embodiment.

(A) Mainly referring to FIGS. 2, 4 and 5, descriptions are given regarding the HST 11, and the HST pedal 60.

An HST trunnion arm 13 is connected to an end part 12a at the right side of the HST trunnion shaft 12.

The connection between the HST trunnion arm 13 and the end part 12a is fixedly performed.

An HST pedal rod 70 in the front-and-rear direction connects the HST trunnion arm 13 and a pedal base part 61 of the HST pedal 60.

The connection between the HST pedal rod 70 and the HST trunnion arm 13 is rotatably performed utilizing a pin 70a, and the connection between the HST pedal rod 70 and the pedal base part 61 is rotatably performed utilizing a pin 70b.

The HST pedal rod 70 rearwardly protrudes from the rear part of the transmission case swelling part 21R.

Hence, since the transmission case swelling part 21R plays the role of the mud guard with regards to mud from ahead of the HST pedal rod 70 which is important to controlling of the HST 11 for ensuring normal traveling, the influence of mud from ahead becomes small, and damage of the HST pedal rod 70 due to accumulation of mud and the like is less prone to occur.

An HST pedal rotation-shaft 80 rotates in correspondence to swinging of the HST pedal 60, and penetrates the transmission case 20 in the left-and-right direction.

The connection between an end part 80a at the right side of the HST pedal rotation-shaft 80 and the pedal base part 61 is fixedly performed.

A pedal stepping-on part 62 of the HST pedal 60, to which a stepping-on operation by the right foot of the worker is performed, is connected to the pedal base part 61. The connection between the pedal base part 61 and the pedal stepping-on part 62 is fixedly performed utilizing bolts 60a and 60b.

Hereupon, in the pedal stepping-on part 62, a round hole the bolt 60a penetrates and a long hole the bolt 60b penetrates are provided, and the attachment-angle of the pedal stepping-on part 62 to the pedal base part 61 is adjustable.

It is desirable that the posture of the variable pump swash-plate (not shown) of the HST 11 which is rotatable around the HST trunnion shaft 12 should, at the time when the posture of the pedal stepping-on part 62 is the horizontality posture, coincide with the neutrality posture for which the HST trunnion opening-degree is zero.

Accordingly, the connection state of the above described configuration elements is adjusted so that the horizontality posture of the pedal stepping-on part 62 is compatible with the neutrality posture of the variable pump swash-plate of the HST 11, that is to say the neutrality posture of the HST trunnion shaft 12.

When a pedal operation of the HST pedal 60 is performed in the frontward orientation which is the orientation indicated with an arrow B, the rotation of the HST trunnion shaft 12 is performed in the orientation indicated with an arrow A, and frontward movement speed-increasing is performed.

In contrast to the above-described, when a pedal operation of the HST pedal 60 is performed in the rearward orientation which is the orientation opposite to the orientation indicated with the arrow B, the rotation of the HST trunnion shaft 12 is performed in the orientation opposite to the orientation indicated with the arrow A, and rearward movement speed-increasing is performed.

Thus, non-step speed-changing corresponding to frontward movement speed-increasing, neutrality and rearward movement speed-increasing, which is in correspondence to a stepping-on operation of the seesaw-type HST pedal 60, is realized.

(B) Mainly referring to FIGS. 2, 4 and 5, descriptions are given regarding a damper mechanism 110.

The damper mechanism 110 has a damper arm 111, a damper stay 112, a damper 113, and the like.

The damper arm 111 is an arm which interlocks with the HST pedal rotation-shaft 80 of the HST pedal 60.

The damper 113 is attached to the damper arm 111.

To the damper stay 112, the lower-end part of the damper 113 is joined.

To the damper arm 111, the upper-end part of the damper 113 is joined.

The damper 113 is arranged behind the transmission case swelling part 21R.

Hence, since the transmission case swelling part 21R plays the role of the mud guard with regards to mud from ahead of the damper 113, the influence of mud from ahead becomes small, and damage of the damper 113 due to accumulation of mud and the like is less prone to occur.

The longitudinal direction of the damper 113 is substantially the up-and-down direction.

Since the damper 113 is in the vertical orientation, and the whole of the damper 113 is arranged in close proximity to the transmission case swelling part 21R, the influence of mud from ahead becomes smaller, and damage of the damper 113 due to accumulation of mud and the like is still less prone to occur.

The damper stay 112 is attached to the vehicle-body 5.

A gear pump 6 is arranged behind the damper 113.

Hence, since the gear pump 6 which is an overall oil-pressure pump directly joined to the engine 2 plays the role of the mud guard with regards to mud from behind the damper 113, the influence of mud from behind becomes small, and damage of the damper 113 due to accumulation of mud and the like is less prone to occur.

More specific descriptions are given regarding the damper mechanism 110 as follows.

The connection between the damper arm 111 and the HST pedal rotation-shaft 80 is fixedly performed.

The damper 113 is arranged below the HST pedal 60.

Since the HST pedal 60 is arranged on the step floor 40 not at the left side of the operation column cover but at the right side of the operation column cover, the link configuration of the HST pedal 60 and the damper 113 is simplified.

Needless to say, a configuration like this is effective in a case where the HST 11 is not an electronic servo HST which does not necessitate the damper 113.

The pushing-orientation damping-force and pulling-orientation damping-force of the damper 113, which affect the HST pedal 60, may be different in correspondence to a starting/stopping pedal operation feeling suited to the preference of a worker or may be the same.

Figure 6:
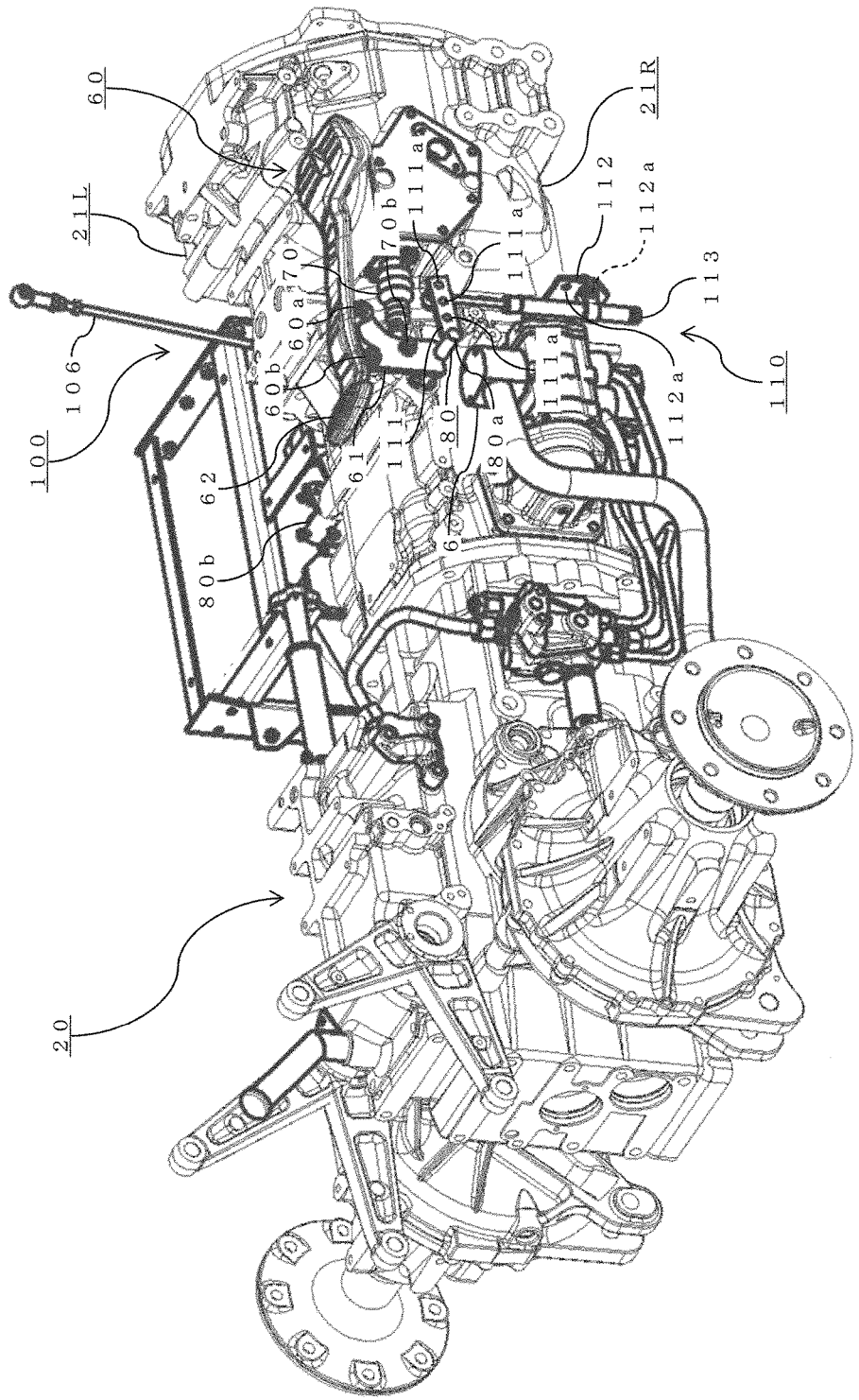
FIG. 6 is a partial perspective view (No. 1) of the neighborhood of the transmission case of the tractor of another embodiment in the present invention.
Figure 7:
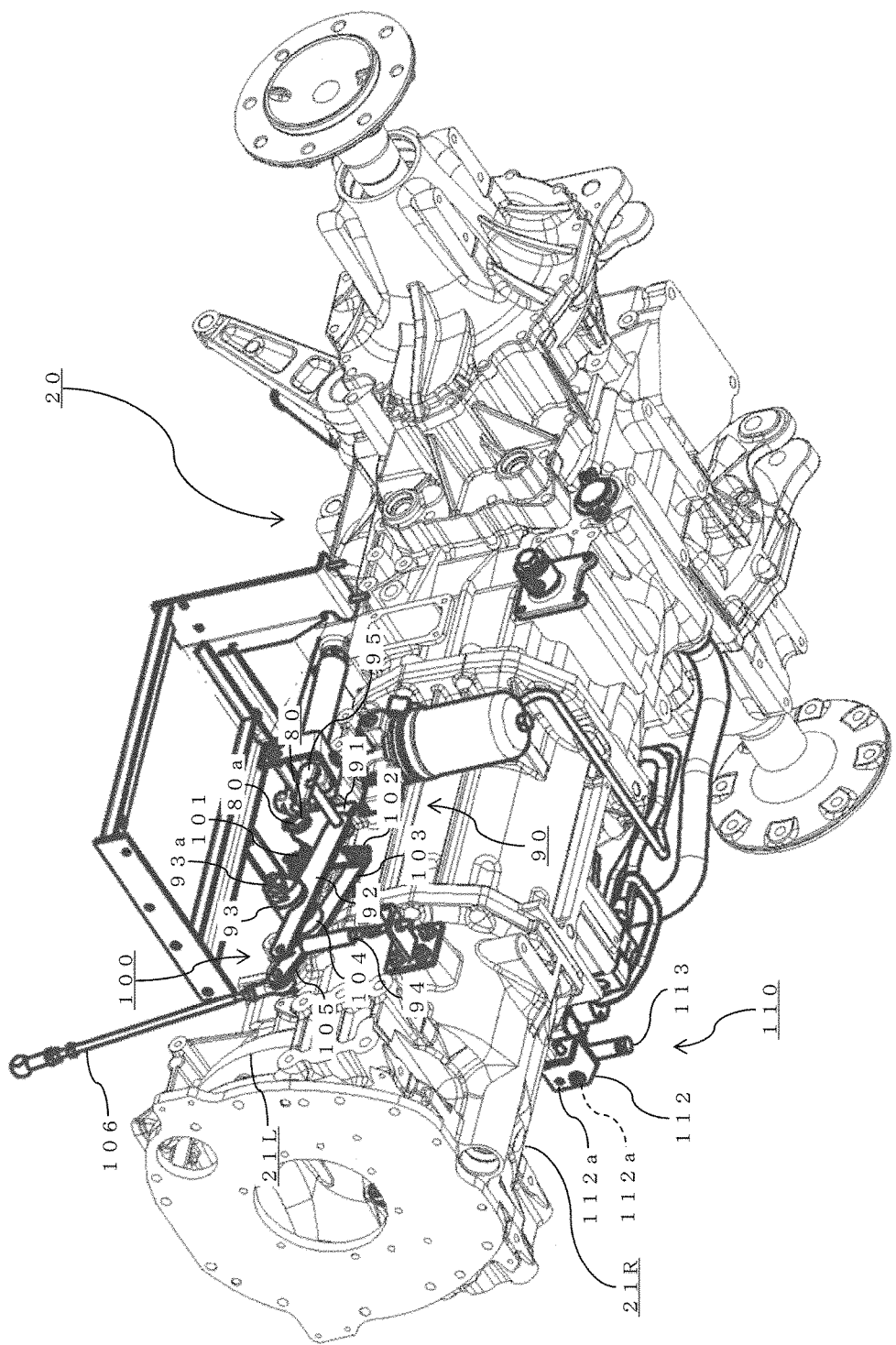
FIG. 7 is a partial perspective view (No. 2) of the neighborhood of the transmission case of the tractor of another embodiment in the present invention.
Figure 8:
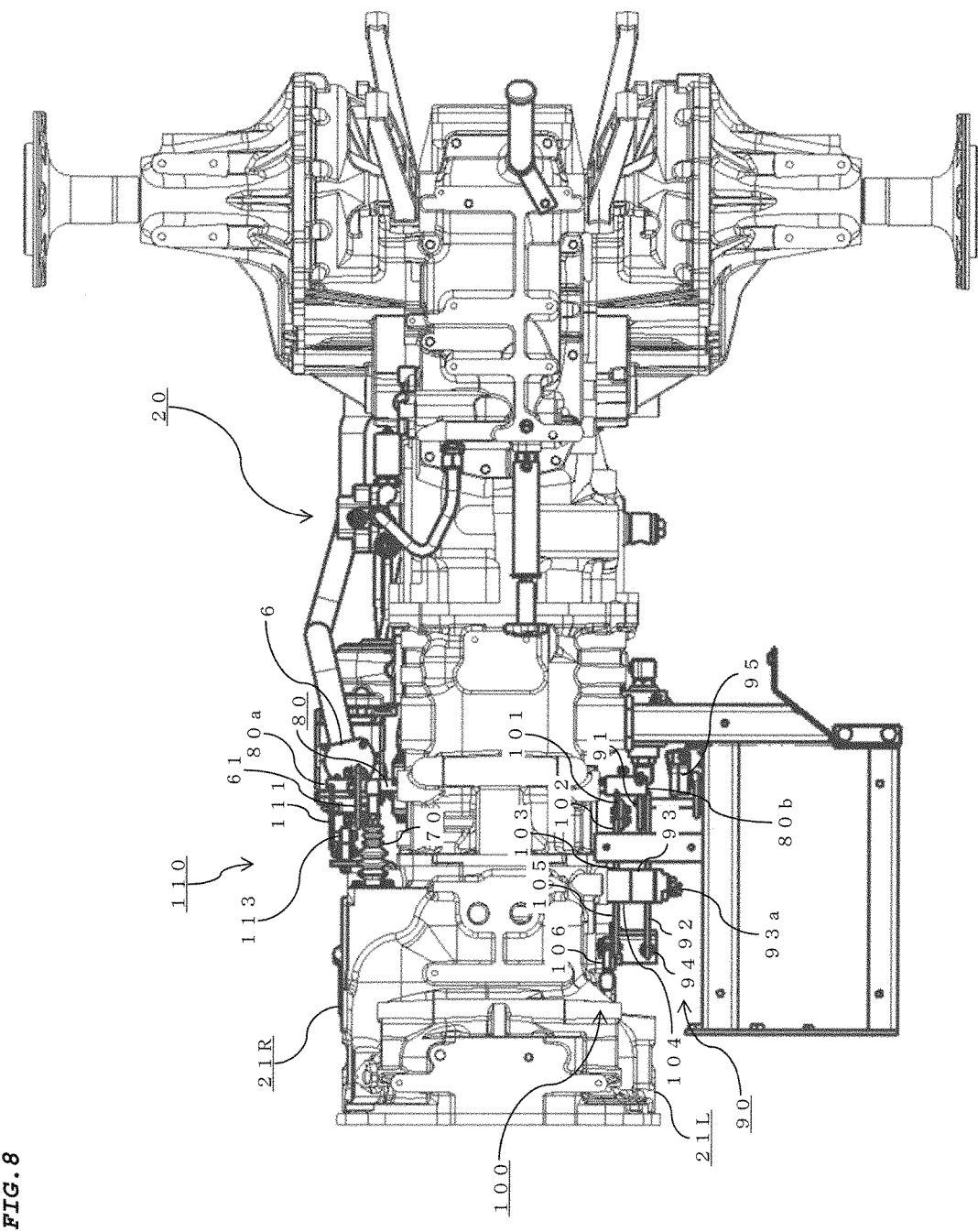
FIG. 8 is a partial top view of the neighborhood of the transmission case of the tractor of another embodiment in the present invention.

(B1) Additionally, as indicated in FIGS. 6 to 8, another embodiment as a variant example is also conceived, where in the damper stay 112, two holes 112a's which are examples of the plural holes to which the damper 113 is selectively joined are provided and, in the damper arm 111, three holes 111a's which are examples of the plural holes to which the damper 113 is selectively joined are provided.

Here, FIGS. 6 and 7 are partial perspective views (Nos. 1 and 2) of the neighborhood of the transmission case 20 of the tractor of the another embodiment in the present invention, and FIG. 8 is a partial top view of the neighborhood of the transmission case 20 of the tractor of the another embodiment in the present invention.

In FIG. 6, the transmission case 20 is viewed from the right upper rear side and, in FIG. 7, the transmission case 20 is viewed from the left lower front side.

Also in FIGS. 6 to 8, for example, the step floor 40 and the like are not shown, so that descriptions in the following will become easier to understand.

For the damper 113, ones of different lengths depending on the largeness of the damping-force are in circulation. Since in the damper stay 112 the two holes 112a's are provided, and in the damper arm 111 the three holes 111a's are provided, divers and various dampers 113 such that the damping-forces which affect the HST pedal 60 are not the same depending on the damper length and the like are selectively used in correspondence to a starting/stopping pedal operation feeling suited to the preference of a worker, and various needs can be met.

More specific descriptions are given as follows.

Such a designing measure is conceived that (1) the hole 112a at the upper side is provided at the basic attachment-position, and the hole 112a at the lower side is provided at the attachment-position corresponding to a relatively large damping-force, and also that (2) the hole 111a at the frontmost side is provided at the basic attachment-position, and a hole 111a relatively at the rear side is provided at the attachment-position corresponding to a relatively small damping-force. Additionally, when attachment to a hole 111a relatively at the rear side is performed, since the affecting-point of the stepping-on force of the HST pedal 60 to the damper 113 gets close to the HST pedal rotation-shaft 80 which becomes the fulcrum, the force which affects the damper 113 becomes relatively large, and the damping-force a worker feels becomes relatively small.

Of course, for example, in the damper arm 111, plural supplemental tap-like members, welding nuts or the like to which the damper 113 is selectively joined may be provided. Dampers 113 such that the damping-forces which affect the HST pedal 60 are not the same depending on the damper attachment-position, length or the like are selectively attached in correspondence to a starting/stopping pedal operation feeling suited to the preference of a worker, and various needs can be met.

Figure 9:
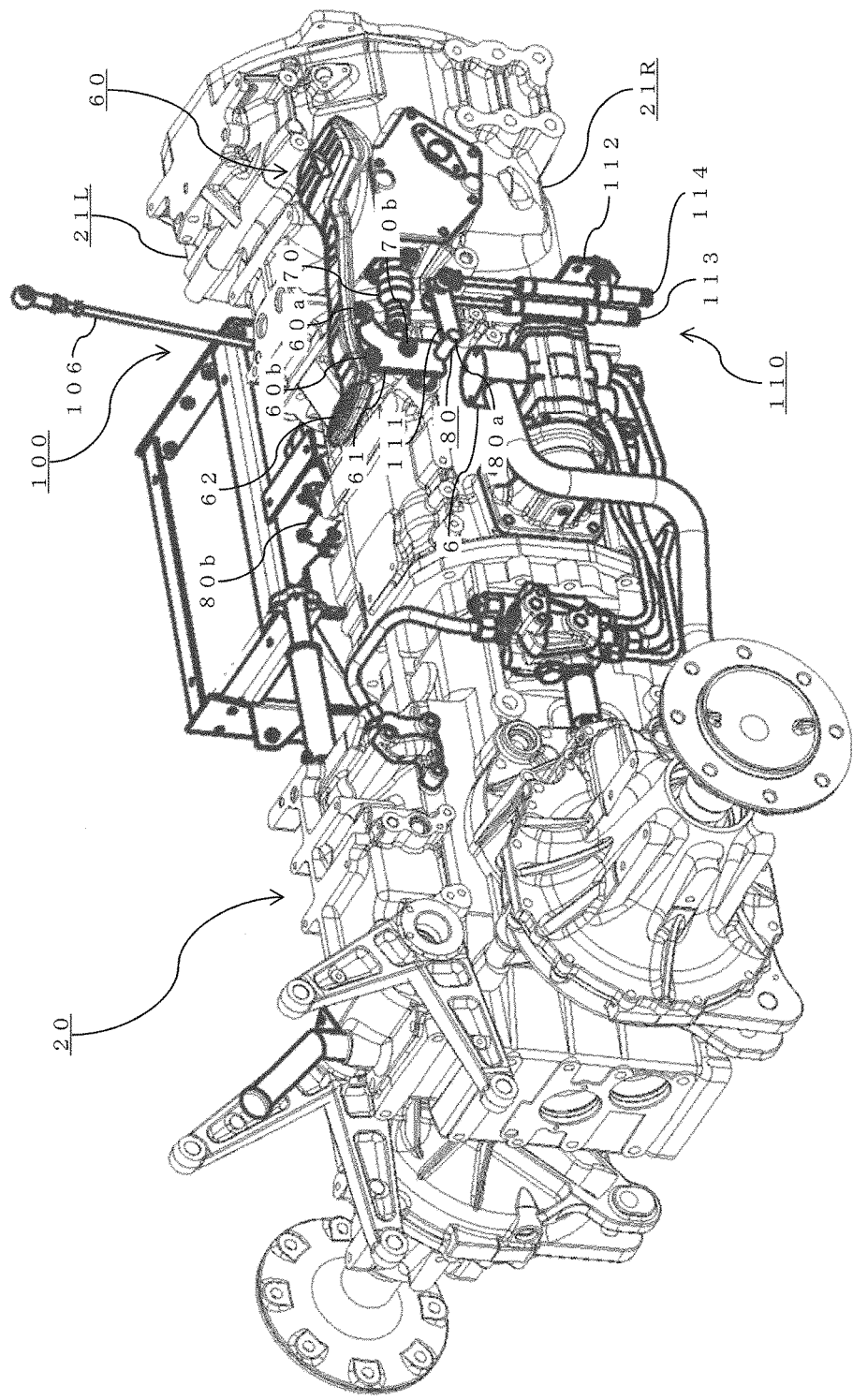
FIG. 9 is a partial perspective view (No. 1) of the neighborhood of the transmission case of the tractor of still another embodiment in the present invention.
Figure 10:
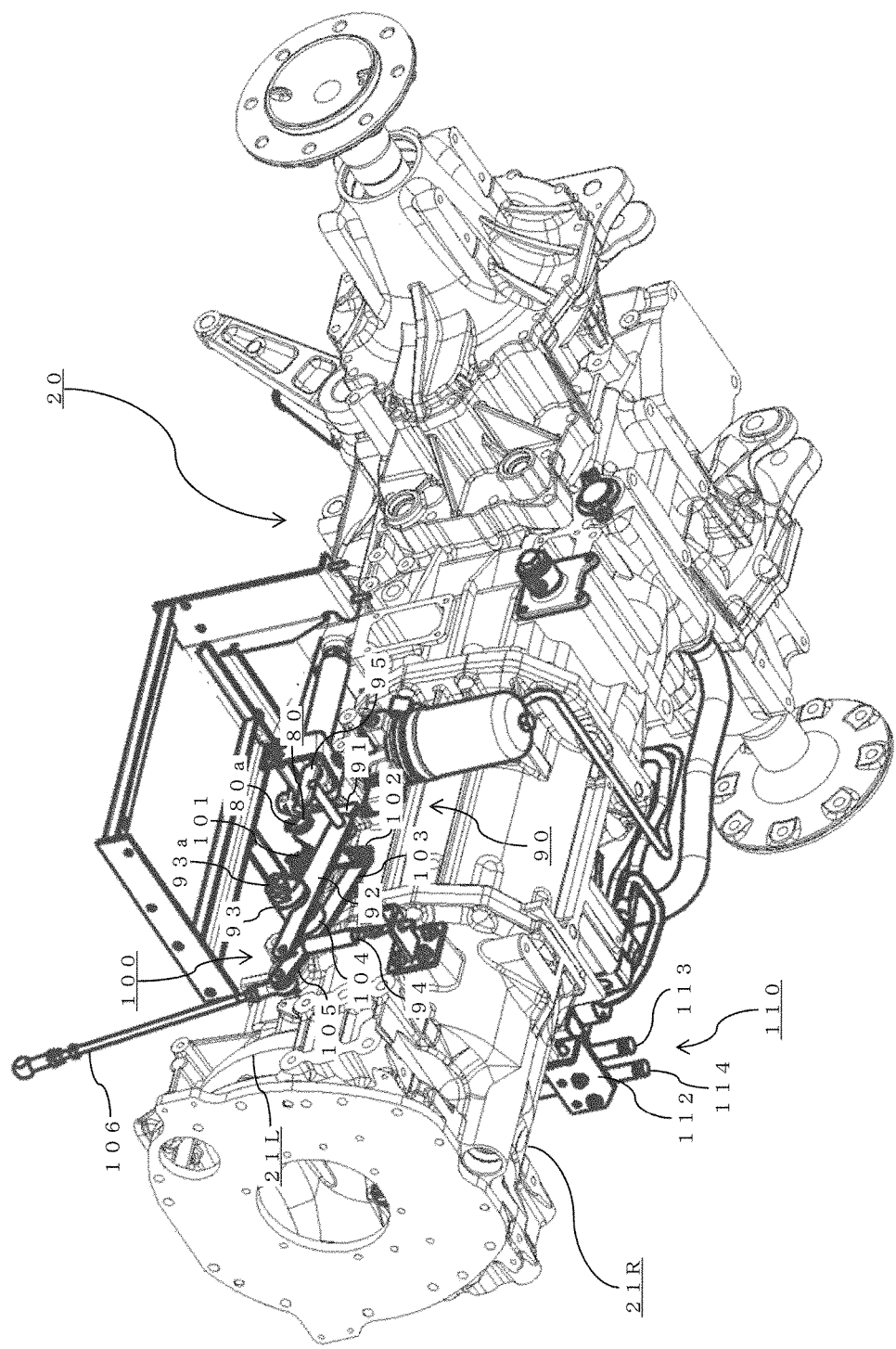
FIG. 10 is a partial perspective view (No. 2) of the neighborhood of the transmission case of the tractor of still another embodiment in the present invention.
Figure 11:
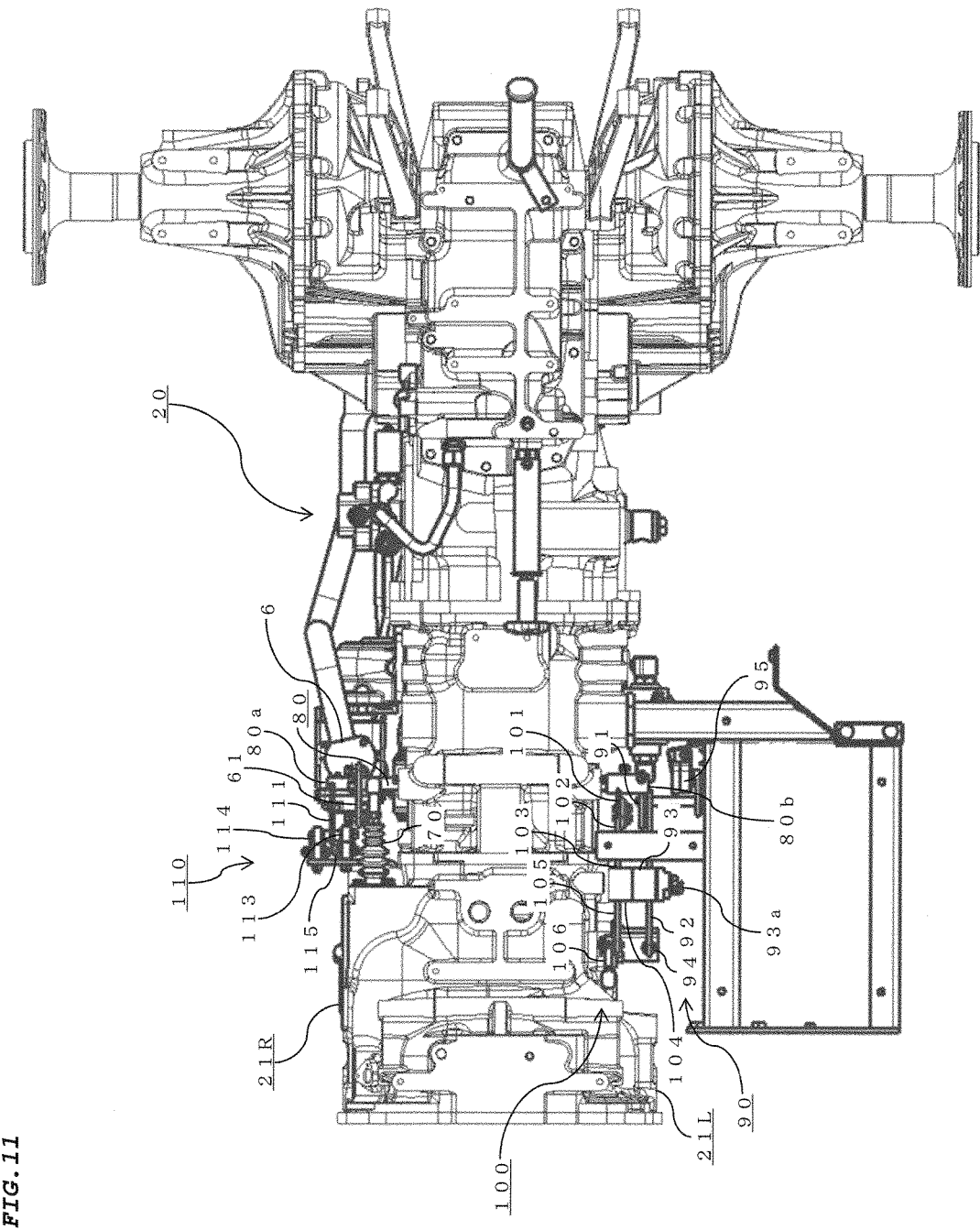
FIG. 11 is a partial top view of the neighborhood of the transmission case of the tractor of still another embodiment in the present invention.

(B2) Moreover, as indicated in FIGS. 9 to 11, still another embodiment as a variant example is also conceived, where the damper mechanism 110 supplementally has a damper 114.

Here, FIGS. 9 and 10 are partial perspective views (Nos. 1 and 2) of the neighborhood of the transmission case 20 of the tractor of the still another embodiment in the present invention, and FIG. 11 is a partial top view of the neighborhood of the transmission case 20 of the tractor of the still another embodiment in the present invention.

In FIG. 9, the transmission case 20 is viewed from the right upper rear side and, in FIG. 10, the transmission case 20 is viewed from the left lower front side.

Also in FIGS. 9 to 11, for example, the step floor 40 and the like are not shown, so that descriptions in the following will become easier to understand.

Since the damper mechanism 110 supplementally has the damper 114, divers and various dampers 114 such that the damping-forces which affect the HST pedal 60 are not the same depending on the damper length and the like are selectively used in correspondence to a starting/stopping pedal operation feeling suited to the preference of a worker, and various needs can be met.

More specific descriptions are given as follows.

The dampers 113 and 114 are attached to a damper-juxtaposing hub 115 which penetrates the damper arm 111 in the left-and-right direction.

To the left side portion of the damper stay 112, the lower-end part of the damper 113 is joined and, to the right side portion of the damper stay 112, the lower-end part of the damper 114 is joined.

To the left side portion of the damper-juxtaposing hub 115, the upper-end part of the damper 113 is joined and, to the right side portion of the damper-juxtaposing hub 115, the upper-end part of the damper 114 is joined.

The damper 114 may be arranged or may not be arranged behind the transmission case swelling part 21R.

The longitudinal direction of the damper 114 is substantially the up-and-down direction.

The gear pump 6 may be arranged or may not be arranged behind the damper 114.

The connection between the damper arm 111 and the damper-juxtaposing hub 115 is fixedly performed.

The damper 114 may be arranged or may not be arranged below the HST pedal 60.

Since the HST pedal 60 is arranged on the step floor 40 not at the left side of the operation column cover but at the right side of the operation column cover, the link configuration of the HST pedal 60 and the damper 114 is simplified.

The pushing-orientation damping-force and pulling-orientation damping-force of the damper 114, which affect the HST pedal 60, may be different in correspondence to a starting/stopping pedal operation feeling suited to the preference of a worker or may be the same.

Of course, for example, the dampers 113 and 114 may be, with the damper-juxtaposing hub 115 not being used, directly attached to the damper arm 111.

Figure 12:
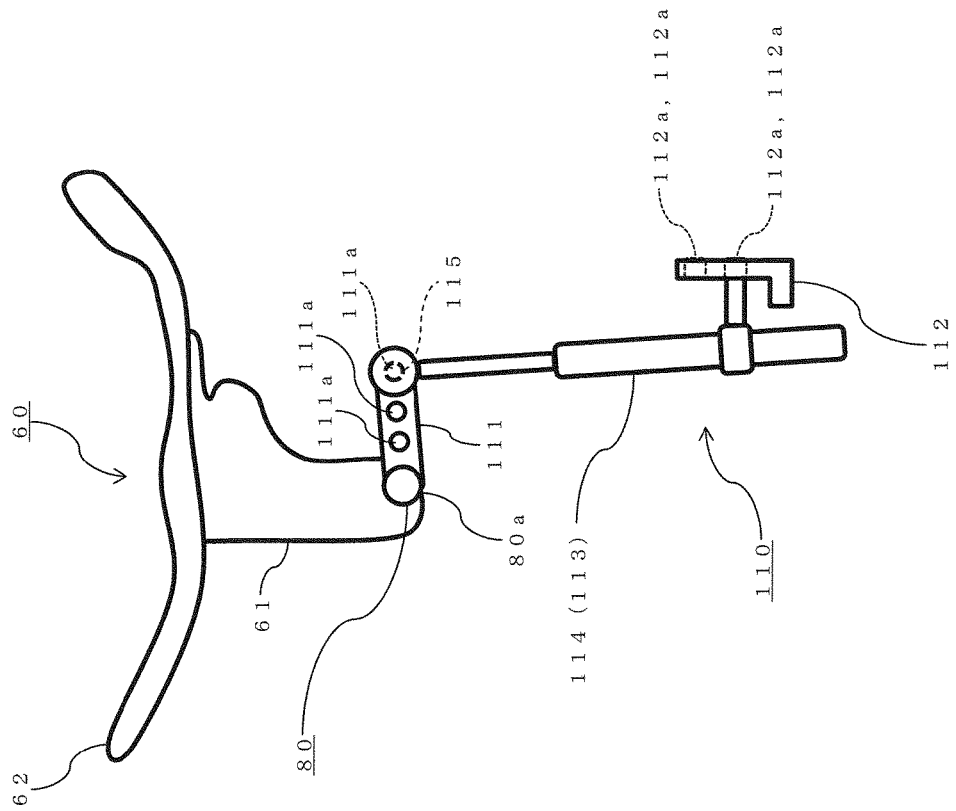
FIG. 12 is a schematic partial right side view of the neighborhood of the damper mechanism of the tractor of yet another embodiment in the present invention.
Figure 13:
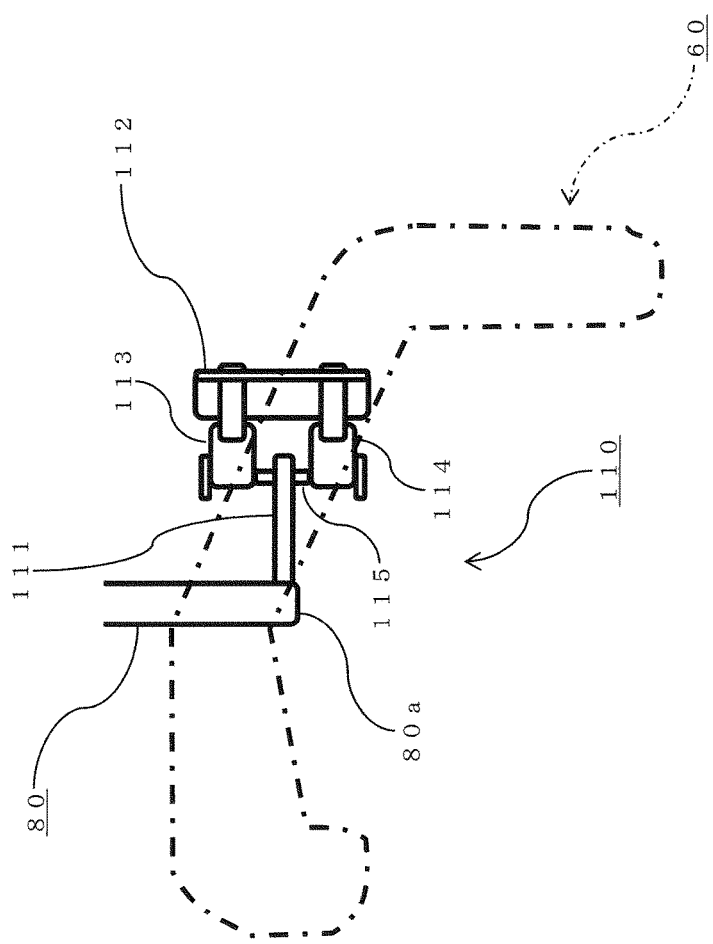
FIG. 13 is a schematic partial top view of the neighborhood of the damper mechanism of the tractor of yet another embodiment in the present invention.

(B3) Moreover, for example, as indicated in FIGS. 12 and 13, yet another embodiment as a variant example is also conceived, where the damper mechanism 110 supplementally has the damper 114, in the damper stay 112, the four holes 112a's to which the dampers 113 and 114 are selectively joined are provided and, in the damper arm 111, the three holes 111a's the damper-juxtaposing hub 115 selectively penetrates are provided.

Here, FIG. 12 is a schematic partial right side view of the neighborhood of the damper mechanism 110 of the tractor of the yet another embodiment in the present invention, and FIG. 13 is a schematic partial top view of the neighborhood of the damper mechanism 110 of the tractor of the yet another embodiment in the present invention.

(C) Mainly referring to FIGS. 3 to 5, descriptions are given regarding an HST neutrality-returning mechanism 90.

The HST neutrality-returning mechanism 90 has an HST neutrality-returning cam 91, an HST neutrality-returning arm 92, an HST neutrality-returning arm rotation-member 93, an HST neutrality-returning spring 94, an HST neutrality-returning arm sensor 95, and the like.

The HST neutrality-returning cam 91 is a cam which interlocks with the HST pedal rotation-shaft 80.

The HST neutrality-returning arm 92 is an arm which abuts the HST neutrality-returning cam 91.

The HST neutrality-returning spring 94 is a spring which energizes the HST neutrality-returning arm 92, so that the HST pedal rotation-shaft 80 returns to the neutrality position.

The lower-end part of the HST neutrality-returning spring 94 is joined to a stay which is attached to the vehicle-body 5, and the upper-end part of the HST neutrality-returning spring 94 is joined to the HST neutrality-returning arm 92.

The HST neutrality-returning arm sensor 95 is a sensor which detects the posture of the HST neutrality-returning arm 92.

For safety, if it is not detected by the HST neutrality-returning arm sensor 95 that the posture of the HST neutrality-returning arm 92 is the neutrality posture, initiation of the engine 2 is regulated.

The HST neutrality-returning cam 91, the HST neutrality-returning arm 92, the HST neutrality-returning spring 94, and the HST neutrality-returning arm sensor 95 are arranged behind the transmission case swelling part 21L.

Hence, since the transmission case swelling part 21L plays the role of the mud guard with regards to mud from ahead of the HST neutrality-returning cam 91, the HST neutrality-returning arm 92, the HST neutrality-returning spring 94, and the HST neutrality-returning arm sensor 95 which are important to controlling of the HST 11 for ensuring normal traveling, the influence of mud from ahead becomes small, and damage of the HST neutrality-returning cam 91, the HST neutrality-returning arm 92, the HST neutrality-returning spring 94, and the HST neutrality-returning arm sensor 95 due to accumulation of mud and the like is less prone to occur.

More specific descriptions are given regarding the HST neutrality-returning mechanism 90 as follows.

The connection between an end part 80b at the left side of the HST pedal rotation-shaft 80 and the HST neutrality-returning cam 91 is fixedly performed.

The connection between the HST neutrality-returning arm 92 and the HST neutrality-returning arm rotation-member 93 is fixedly performed.

The HST neutrality-returning arm rotation-member 93 is rotatable with a fulcrum pin 93a as an eccentric fulcrum shaft.

The HST neutrality-returning mechanism 90 also has the following function for adjusting the neutrality position which is the position where the HST neutrality-returning spring 94 stands still and the spring returning-force does not affect anything.

When an adjustment rotation operation of the HST neutrality-returning arm rotation-member 93 by the worker is performed in the orientation indicated with an arrow D, the rotation of the HST pedal rotation-shaft 80 is performed in the orientation indicated with an arrow C, and the rotation of the HST trunnion shaft 12 is performed in the orientation indicated with the arrow A.

An adjustment rotation operation like this is effective in a case where the neutrality posture of the HST trunnion shaft 12 has shifted to the rearward movement speed-increasing side.

In contrast to the above-described, when an adjustment rotation operation of the HST neutrality-returning arm rotation-member 93 by the worker is performed in the orientation opposite to the orientation indicated with the arrow D, the rotation of the HST pedal rotation-shaft 80 is performed in the orientation opposite to the orientation indicated with the arrow C, and the rotation of the HST trunnion shaft 12 is performed in the orientation opposite to the orientation indicated with the arrow A.

An adjustment rotation operation like this is effective in a case where the neutrality posture of the HST trunnion shaft 12 has shifted to the frontward movement speed-increasing side.

Since shifting of the neutrality posture of the HST trunnion shaft 12 does not frequently occur, a function like this is usually used at the time of building in a factory, or at the time of assembling after dismantling in maintenance after shipping.

It is desirable that, after an adjustment rotation operation of the HST neutrality-returning arm rotation-member 93 by the worker is completed, the attachment-angle of the pedal stepping-on part 62 to the pedal base part 61 should be adjusted so that the horizontality posture of the pedal stepping-on part 62 is compatible with the neutrality posture of the HST trunnion shaft 12.

(D) Mainly referring to FIGS. 3 to 5, descriptions are given regarding an auto-cruise link mechanism 100.

The auto-cruise link mechanism 100 has an arm 101, a link plate 102, an auto-cruise plate 103, a rotation arm-member 104, an auto-cruise arm 105, an auto-cruise rod 106, and the like.

The auto-cruise arm 105 is an arm which interlocks with the HST pedal rotation-shaft 80.

The auto-cruise arm 105 is arranged behind the transmission case swelling part 21L.

Hence, since the transmission case swelling part 21L plays the role of the mud guard with regards to mud from ahead of the auto-cruise arm 105 which is important to controlling of the HST 11 for ensuring normal traveling, the influence of mud from ahead becomes small, and damage of the auto-cruise arm 105 due to accumulation of mud and the like is less prone to occur.

More specific descriptions are given regarding the auto-cruise link mechanism 100 as follows.

The connection between the end part 80b at the left side of the HST pedal rotation-shaft 80 and the arm 101 is fixedly performed.

The connection between the arm 101 and the link plate 102 is rotatably performed utilizing a pin.

The connection between the link plate 102 and the auto-cruise plate 103 is rotatably performed utilizing a pin.

The connection between the auto-cruise plate 103 and the rotation arm-member 104 is fixedly performed.

The rotation arm-member 104 is rotatable with the fulcrum pin 93a as a fulcrum shaft.

The rotation arm-member 104 and the HST neutrality-returning arm rotation-member 93 independently rotate individually in correspondence to rotation of the HST pedal rotation-shaft 80, but the fulcrum pin 93a is a common fulcrum shaft of the rotation arm-member 104 and the HST neutrality-returning arm rotation-member 93, and the number of components is curtailed.

The connection between the rotation arm-member 104 and the auto-cruise arm 105 is fixedly performed.

The connection between the auto-cruise arm 105 and the auto-cruise rod 106 is rotatably performed utilizing a pin.

When a pedal operation of the HST pedal 60 is performed in the frontward orientation which is the orientation indicated with the arrow B, the rotation of the HST pedal rotation-shaft 80 is performed in the orientation indicated with the arrow C, and the sliding of the auto-cruise rod 106 is performed in the upward orientation which is the orientation indicated with an arrow X.

In contrast to the above-described, when a pedal operation of the HST pedal 60 is performed in the rearward orientation which is the orientation opposite to the orientation indicated with the arrow B, the rotation of the HST pedal rotation-shaft 80 is performed in the orientation opposite to the orientation indicated with the arrow C, and the sliding of the auto-cruise rod 106 is performed in the downward orientation which is the orientation opposite to the orientation indicated with the arrow X.

Of course, the positions where the joining part of the auto-cruise link mechanism fixation-member (not shown) abuts the upper-end part of the auto-cruise link mechanism 100 are, at a plurality of spots, correspondingly to the rotation-angles of the HST trunnion shaft 12, continuously or discretely provided.

A working vehicle in the present invention is such that damage of the damper is able to be made less prone to occur, and is useful for the purpose of utilizing for a working vehicle such as a tractor or the like.

What is claimed is:

1. A working vehicle, comprising:
an HST pedal which operates an HST;
a damper arm which interlocks with an HST pedal rotation-shaft of the HST pedal;
a damper attached to the damper arm; and
a transmission case, wherein
the transmission case has a first transmission case swelling part swelling to at least one side with respect to a left-and-right direction,
the damper is arranged behind the first transmission case swelling part, and
a longitudinal direction of the damper is an up-and-down direction.

2. The working vehicle according to claim 1, comprising a gear pump arranged behind the damper.

3. The working vehicle according to claim 2, comprising:
an HST neutrality-returning cam which interlocks with the HST pedal rotation-shaft;
an HST neutrality-returning arm which abuts the HST neutrality-returning cam; and
an HST neutrality-returning spring which energizes the HST neutrality-returning arm, so that the HST pedal rotation-shaft returns to a neutrality position, wherein
the transmission case has a second transmission case swelling part swelling to another side with respect to the left-and-right direction, the another side being a side opposite to the one side, and
the HST neutrality-returning cam, the HST neutrality-returning arm, and the HST neutrality-returning spring are arranged behind the second transmission case swelling part.

4. The working vehicle according to claim 1, comprising:
an HST neutrality-returning cam which interlocks with the HST pedal rotation-shaft;
an HST neutrality-returning arm which abuts the HST neutrality-returning cam; and
an HST neutrality-returning spring which energizes the HST neutrality-returning arm, so that the HST pedal rotation-shaft returns to a neutrality position, wherein
the transmission case has a second transmission case swelling part swelling to another side with respect to the left-and-right direction, the another side being a side opposite to the one side, and
the HST neutrality-returning cam, the HST neutrality-returning arm, and the HST neutrality-returning spring are arranged behind the second transmission case swelling part.

5. A working vehicle comprising:
an HST pedal which operates an HST;
a damper arm which interlocks with an HST pedal rotation-shaft of the HST pedal;
a damper attached to the damper arm; and
a transmission case;
an HST neutrality-returning cam which interlocks with the HST pedal rotation-shaft;
an HST neutrality-returning arm which abuts the HST neutrality-returning cam; and
an HST neutrality-returning spring which energizes the HST neutrality-returning arm, so that the HST pedal rotation-shaft returns to a neutrality position, wherein
the transmission case has a first transmission case swelling part swelling to at least one side with respect to a left-and-right direction,
the damper is arranged behind the first transmission case swelling part, and
the transmission case has a second transmission case swelling part swelling to another side with respect to the left-and-right direction, the another side being a side opposite to the one side, and the HST neutrality-returning cam, the HST neutrality-returning arm, and the HST neutrality-returning spring are arranged behind the second transmission case swelling part.

6. A working vehicle comprising:
an HST pedal which operates an HST;
a damper arm which interlocks with an HST pedal rotation-shaft of the HST pedal;
a damper attached to the damper arm;
a transmission case; and
a damper stay which is attached to a vehicle-body, and supports the damper, wherein
the transmission case has a first transmission case swelling part swelling to at least one side with respect to a left-and-right direction,
the damper is arranged behind the first transmission case swelling part, and
in the damper stay, plural holes to which the damper is selectively joined are provided.

7. A working vehicle comprising:
an HST pedal which operates an HST;
a damper arm which interlocks with an HST pedal rotation-shaft of the HST pedal;
a damper attached to the damper arm; and
a transmission case, wherein
the transmission case has a first transmission case swelling part swelling to at least one side with respect to a left-and-right direction,
the damper is arranged behind the first transmission case swelling part, and
in the damper arm, plural holes to which the damper is selectively joined are provided.

* * * * *